US008631556B2

(12) United States Patent
Pohlmann et al.

(10) Patent No.: US 8,631,556 B2
(45) Date of Patent: Jan. 21, 2014

(54) PROCESS FOR MANUFACTURING A PLASTIC FUEL TANK EQUIPPED WITH A PUMP

(75) Inventors: Ralph Pohlmann, Margny-les-Compiegne (FR); Franck Dhaussy, Margny-les-Compiegne (FR)

(73) Assignee: Inergy Automotive Systems Research (Société Anonyme), Brussels (BE)

( * ) Notice: Subject to any disclaimer, the term of this patent is extended or adjusted under 35 U.S.C. 154(b) by 232 days.

(21) Appl. No.: 13/059,146

(22) PCT Filed: Aug. 26, 2009

(86) PCT No.: PCT/EP2009/060958
§ 371 (c)(1),
(2), (4) Date: Feb. 15, 2011

(87) PCT Pub. No.: WO2010/023212
PCT Pub. Date: Mar. 4, 2010

(65) Prior Publication Data
US 2011/0131789 A1    Jun. 9, 2011

(30) Foreign Application Priority Data
Sep. 1, 2008 (FR) .................................... 0855841

(51) Int. Cl.
B23P 17/00    (2006.01)
B29C 49/00    (2006.01)
B65D 6/00     (2006.01)

(52) U.S. Cl.
USPC ............ 29/527.1; 29/469; 264/516; 264/553; 264/554; 220/4.13; 220/4.14; 220/562

(58) Field of Classification Search
USPC ......... 29/527.1, 469; 264/516, 523, 540, 553, 264/554; 220/4.12, 4.13, 4.14, 562
See application file for complete search history.

(56) References Cited

U.S. PATENT DOCUMENTS 5,040,516 A * 8/1991 Haraguchi ..................... 123/509
5,308,427 A * 5/1994 Duhaime et al. .............. 156/245
(Continued)

FOREIGN PATENT DOCUMENTS

CA    2641463 A1    8/2007
CN    1764558 A     4/2006
(Continued)

OTHER PUBLICATIONS

U.S. Appl. No. 13/057,180, Frederic Jannot, et al, filed Feb. 2, 2011.
(Continued)

Primary Examiner — Essama Omgba
(74) Attorney, Agent, or Firm — Oblon, Spivak, McClelland, Maier & Neustadt, L.L.P.

(57) ABSTRACT

A process for manufacturing a plastic fuel tank including: introducing a parison into mold cavities; introducing a core inside the parison, where the core is first fitted with a swirl pot having a housing for the pump; closing the mold so that the cavities come into leaktight contact with the core; pressing the parison against the cavities by blowing through the core and/or applying a vacuum behind the cavities; fastening the swirl pot to the parison using a device attached to the core; molding the parison by blow molding and/or thermoforming; unmolding the tank, and mounting a pump in the housing of the swirl pot. The mounting of the pump is achieved by way of an intermediate part, the external shape of which is standard and complementary to that of the housing, and the internal shape of which is adapted to the pump.

17 Claims, 5 Drawing Sheets

(56) References Cited

U.S. PATENT DOCUMENTS

| | | | |
|---|---|---|---|
| 5,647,328 A * | 7/1997 | Fournier et al. | 123/509 |
| 5,647,329 A * | 7/1997 | Bucci et al. | 123/509 |
| 5,931,353 A * | 8/1999 | Guyomard et al. | 222/385 |
| 6,415,941 B1 * | 7/2002 | Huse | 220/562 |
| 6,488,476 B2 * | 12/2002 | Eck | 417/76 |
| 6,726,967 B2 * | 4/2004 | Vorenkamp et al. | 428/34.1 |
| 7,520,270 B2 | 4/2009 | Uhara | |
| 7,861,885 B2 * | 1/2011 | Borchert et al. | 220/562 |
| 8,122,604 B2 * | 2/2012 | Jannot et al. | 29/897.2 |
| 8,282,875 B2 * | 10/2012 | Roos et al. | 264/516 |
| 2001/0015513 A1 | 8/2001 | Schaftingen et al. | |
| 2002/0020487 A1 * | 2/2002 | Vorenkamp et al. | 156/244.19 |
| 2002/0063129 A1 * | 5/2002 | Potter et al. | 220/4.13 |
| 2002/0125254 A1 * | 9/2002 | Hagano et al. | 220/562 |
| 2003/0188724 A1 | 10/2003 | Suzuki | |
| 2005/0284872 A1 * | 12/2005 | Gombert et al. | 220/562 |
| 2008/0149642 A1 * | 6/2008 | Borchert et al. | 220/562 |
| 2008/0224363 A1 * | 9/2008 | Criel et al. | 264/526 |
| 2008/0308071 A1 | 12/2008 | Eck et al. | |
| 2009/0290994 A1 * | 11/2009 | Kieninger et al. | 417/198 |
| 2009/0308356 A1 * | 12/2009 | Eck et al. | 123/495 |
| 2010/0006071 A1 * | 1/2010 | Froehlich et al. | 123/497 |
| 2011/0035928 A1 * | 2/2011 | Mbog et al. | 29/428 |
| 2011/0131771 A1 * | 6/2011 | Jannot et al. | 24/571 |
| 2011/0131788 A1 * | 6/2011 | Jannot et al. | 29/525.06 |

FOREIGN PATENT DOCUMENTS

| | | |
|---|---|---|
| CN | 1782363 A | 6/2006 |
| DE | 10010900 A1 | 9/2001 |
| DE | 102005047546 B3 | 2/2007 |
| DE | 102006006469 A1 | 8/2007 |
| EP | 1110697 A2 | 6/2001 |
| EP | 1506889 A2 | 2/2005 |
| EP | 1564401 A1 | 8/2005 |
| GB | 1410215 A | 10/1975 |
| WO | WO 2006008308 | 1/2006 |
| WO | WO 2006095024 A1 | 9/2006 |
| WO | WO 2009007433 A1 | 1/2009 |
| WO | WO 2009043660 A2 | 4/2009 |
| WO | WO 2010015615 A1 | 2/2010 |
| WO | WO 2010015670 A1 | 2/2010 |
| WO | WO 2010015673 A1 | 2/2010 |

OTHER PUBLICATIONS

U.S. Appl. No. 13/057,185, Frederic Jannot, et al, filed Feb. 2, 2009.
U.S. Appl. No. 13/057,203, Frederic Jannot, et al, filed Feb. 2, 2011.

* cited by examiner

_US 8,631,556 B2_

PROCESS FOR MANUFACTURING A PLASTIC FUEL TANK EQUIPPED WITH A PUMP

CROSS-REFERENCE TO RELATED APPLICATIONS

This application is a U.S. national stage entry under 35 U.S.C. §371 of International Application No. PCT/EP2009/060958 filed Aug. 26, 2009, which claims priority to French Application No. 08.55841 filed Sep. 1, 2008, this application being herein incorporated by reference in its entirety for all purposes.

TECHNICAL FIELD OF THE INVENTION

The present invention relates to a process for manufacturing a plastic fuel tank equipped with a pump.

BACKGROUND OF THE INVENTION

Fuel tanks on board vehicles of various kinds must generally meet sealing and permeability standards in relation to the type of usage for which they are designed and the environmental requirements with which they must comply. Both in Europe and throughout the world we are currently experiencing a considerable tightening of the requirements concerned with limiting the emissions of pollutants into the atmosphere and into the environment in general.

To limit these emissions, the Applicant has developed a method of molding a tank from a parison that includes at least one slot for introducing thereinto (and fastening thereto) (supports for) accessories during the actual molding of the tank and thus avoiding drilling openings (see for example Application EP 1 110 697).

The Applicant has also developed a particular method for this fastening (in situ snap-riveting, the subject of Application WO 2006/008308, the content of which is, for this purpose, incorporated by reference into the present application) and also an improvement of this method that is the subject of international Application EP 2008/059042 in the name of the Applicant, the content of which is also incorporated by reference into the present application.

The objective of this improvement is to provide an improved geometry of the snap-riveting zone that makes it possible to ensure self-centring of the accessory with respect to the tool which will carry out the snap-riveting and that makes it possible to obtain a better distribution of the stress during this process. This geometry consists of a concave relief at least partially surrounding the snap-riveting orifice and having a size and shape suitable for being able to cooperate with a protuberance (convex relief) of the tool during the snap-riveting.

The Applicant has successfully applied this improvement to the fastening of numerous accessories—or of the support thereof in the case of accessories that do not withstand the pressure and temperature conditions during molding—and/or for expensive accessories that should be dismantled from tanks that do not meet the standards before the latter are ground up (reduced to scrap that can be recycled during the molding of subsequent tanks).

In the particular case where the accessory is composed of the fuel pump (known as the "main feed pump" and supplying the engine of the vehicle with fuel), the support in question is in fact composed of what is referred to as the "swirl pot". As its name indicates, the objective of this swirl pot is to constitute a fuel reserve for the cases where the vehicle negotiates a turn, drives on a slope, etc. or in any other situation where the pump suction point risks being exposed (no longer dipping in the fuel). One advantage of the process described above is that it makes it possible to provide a large capacity swirl pot, in particular when the parison is cut into two sheets. However, one drawback with which the Applicant has been confronted lies in the fact that as several types of pump exist, it is necessary to adapt the swirl pot depending on the pump chosen by the constructor and therefore, generally, to provide a swirl pot specific to each model, which is expensive (this part generally being based on a plastic molded in a mold specific to its (fixed) geometry).

SUMMARY OF THE INVENTION

The present invention aims to solve this problem and to provide a process for fastening any type of pump to a fuel tank.

For this purpose, the invention relates to a process for manufacturing a plastic fuel tank equipped with a pump by molding a tubular parison cut into two sheets with the aid of a mold comprising two cavities and a core, said process comprising the following steps:

step 1. the parison is introduced into the mold cavities;
step 2. the core is introduced inside the parison, said core having first been fitted with a swirl pot comprising a housing for the pump;
step 3. the mold is closed so that the cavities come into leaktight contact with the core;
step 4. the parison is pressed against the cavities by blowing through the core and/or applying a vacuum behind the cavities;
step 5. using a device firmly attached to the core, the swirl pot is fastened to the parison;
step 6. the mold is opened to withdraw the core;
step 7. the final molding of the parison is carried out by blow molding (by injecting a pressurized fluid inside the parison) and/or thermoforming (by applying a vacuum behind the cavities); and
step 8. the tank is demolded and through an opening in the latter the pump is mounted in the housing of the swirl pot.

According to the invention, the mounting of the pump is achieved by way of an intermediate part, the external shape of which is standard, fixed (which means that its overall height and width are fixed) and complementary to that of the housing, and the internal shape of which is adapted to the pump. This intermediate part may be mounted in its housing before or after the fastening of the swirl pot to the tank, preferably after, simply by "plug & play", which means that this part can be (de)mounted on/from the housing as it is, through a quick connect type connection (like a plug in for instance) without having to alter its overall geometry. Such a kind of mounting is quick and safe, so interesting from an economical and technical point of view.

BRIEF DESCRIPTION OF THE DRAWINGS

For a detailed description of the invention, reference will now be made to the accompanying drawings in which.

DESCRIPTION OF THE PREFERRED EMBODIMENTS

Figure 1:
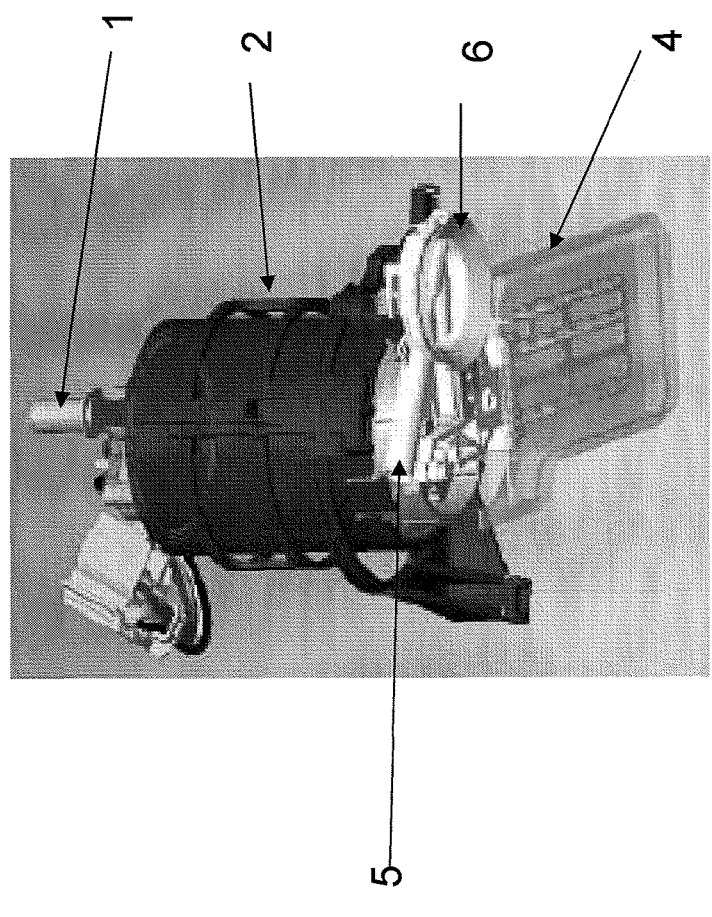
FIG. 1 illustrates a pump located in an intermediate part.

According to one preferred variant, this intermediate part may be provided with flexible support(s) whose role is to absorb the vibrations of the pump and, in doing so, reduce the acoustic emissions. Alternatively, it is possible to provide the pump with such a support before introducing it into the intermediate part.

The intermediate part may be in one piece. However, preferably, it comprises a pump holder and a separate cover in order to be able to provide leaktightness to the swirl pot (see below). As mentioned above, the pump holder may be plugged into the housing by any kind of quick connection. One that gives good results comprises both a spherical linkage (of the ball and socket type) and a lever arm with a clip. The aim of the first (ball and socket) is to position the pump while providing it some freedom of movement (so that the seal(s) usually used to ensure the priming function, can be positioned correctly) and the aim of the later (lever with clip) is to maintain the correction position while allowing an easy dismounting). The separate cover then enables to lock the assembly and to ensure leaktightness as explained above.

The objects mentioned above (in particular the swirl pot and the intermediate part) are preferably based on polyacetal, and in particular on POM (polyoxymethylene), for its mechanical resistance and its geometrical rigidity to the fuel, they may also (but less commonly, considering the size of these parts) be based on PPS (polyphenylene sulfide) which has the advantage of being very rigid or on PBT (but the latter is not compatible with alcohol fuels).

In one preferred variant of the invention (1), the swirl pot is leaktight (i.e. free from leaks). Most particularly preferably, it comprises, for this purpose, a bowl sealed in a leaktight manner by a cover.

Alternatively or additionally (2), this swirl pot preferably has a capacity between 2 and 5 1, or even between 2.5 and 4 1. Specifically, a leaktight, large capacity swirl pot makes it possible to provide the maximum loading of the engine whatever the circumstances.

In the case where the tank is in the form of a saddle tank, the swirl pot is preferably fed by two jet pumps: one sucking up fuel in the main pouch and the other being located in the secondary pouch and enabling fuel in this pouch to be transferred to the top of the swirl pot (i.e. into its cover) via a line known as a transfer line. These jet pumps are preferably both activated by the main pump for "petrol" versions and by the fuel return for "diesel" versions.

Preferably, the transfer line is also fastened to the tank when it is being molded (3), preferably at several points (see Application FR 0757991 in the name of the Applicant, the content of which is incorporated by reference in the present application). According to one particularly preferred variant (4) that makes it possible to obtain a leaktight connection between the fuel transfer line and the swirl pot, despite the shrinkage of the tank after molding, the swirl pot (and preferably its cover) is provided with a relief into which the end of the transfer line may slide so as to be able to put up with this shrinkage, which is of the order of 3% in the case of an HDPE tank. Alternatively or additionally, this line may be provided with at least one flexible part and/or a bend put under tension during the molding in order to come back to rest when the tank is cooled (as described in Application WO 2006/095024 in the name of the Applicant, the content of which is also incorporated by reference in the present application).

Similarly, in order to minimize leaks of fuel at the location through which the main jet pump conveys fuel from the main pouch into the swirl pot, it is preferred to surround the suction orifice with a relief that makes it possible to provide a leaktight connection of said pump while allowing it a certain freedom of movement (to compensate for distortions, shrinkages, etc.).

The swirl pots of fuel tanks commonly serve as a support for a gauge that makes it possible to measure the level of fuel either in the entire tank, or in one pouch of the latter. Generally, this gauge consists of a float located at one end of an arm (metal rod) that is fixed to and pivots around one point of the swirl pot or a part integrated into the latter. This rod generally comprises a conductive part, the position of which is detected by a specific sensor that thus makes it possible to know the position of the arm, and therefore of the float, and therefore the level of fuel in the tank. In general, this arm pivots in a vertical plane. According to one preferred variant of the invention (5), instead of pivoting in a vertical plane, the arm pivots (in fact describes an arc around its point of attachment) in an oblique plane.

This variant makes it possible to position the trajectory of the float arm in the better gauging zone, which, in the case of saddle tanks, is in an unreachable zone in the centre of the tank. This variant also makes it possible to measure high fuel levels, even in pouches of complicated shape. One way of achieving it in practice consists in fastening the gauge to an oblique surface of the swirl pot. To do this, a plastic adapting part may be produced that makes it possible to receive the gauge in an inclined fastening guide and which will be fastened to the swirl pot in a vertical fastening guide. A simpler way is of course to create the gauge support directly with the inclination and to fasten this support to the swirl pot (which is generally vertical).

In yet another preferred variant of the invention (6), the lines starting from or leading to the swirl pot are preferably fastened to the swirl pot using clips that are preferably molded from a single part with it, or even with its cover, where appropriate, for reasons of manufacturing cost and ease of subsequent assembly.

According to the invention, the swirl pot is fastened to the parison during its actual molding to form the tank. This fastening may be carried out in any known manner. Preferably, at least one of its fastening points is provided with an orifice that enables snap-riveting (common technique in the field of metallurgy that consists in molding a rivet in situ, from molten material that has been made to flow through an orifice in the part to be fastened and then left therein to solidify).

Preferably, the snap-riveting orifice is made in a fastening tab molded as one part with the swirl pot or attached thereto. It may be a simple part of the accessory (being part of its overall envelope) provided with at least one orifice or with a protuberance with respect to its overall envelope provided with an orifice.

This fastening tab can have any shape: tongue provided with one or more orifices; flange surrounding the accessory and comprising several orifices, etc.

Preferably, the swirl pot is equipped with several fastening tabs, if possible distributed evenly over the latter. Most particularly preferably, each fastening tab comprises several orifices so as to distribute the load during a mechanical stress (for example, simply exerted by gravity).

Within the context of the invention, although the swirl pot is fastened to the wall of the tank, it is preferred that it can move relative to at least one of its fastening points on the wall of the tank. This mobility may be obtained in various ways. In the case where the accessory comprises at least one fastening tab, it is sufficient to ensure that this is in the form of a flexible tongue, i.e. a part that is flat (but which may be curved, folded, etc.) having a thickness, a shape and/or a constituent material that give the accessory a relative mobility with respect to the wall of the tank when it is fastened thereto.

The fastening tabs according to this variant of the invention are preferably based on a heat-resistant material in order to prevent an exaggerated deformation of the latter. Materials such as POM (polyoxymethylene), PA (polyamide), PBT (polybutylene terephthalate) and metals are particularly suitable. HDPE is less recommended as it can deform at the usage temperature, at least for the thicknesses generally considered (2 to 3 mm).

Most particularly preferably, each fastening tab is provided with a circular orifice, preferably located substantially at the centre of its zone for fastening to the tank (i.e. the zone in contact with the parison during the snap-riveting) and this circular orifice is preferably surrounded by several slots (2, 3, 4 or more) that are preferably distributed evenly over a circumference surrounding the central orifice, the purpose of which is to increase the load-bearing strength of the fastening (the component acting via its weight on the still molten plastic in the snap-riveting zone). Generally, the fastening zone of the tab is located at a curved (folded) end of this tab.

According to a last particularly preferred variant of the invention (7), the swirl pot is fastened to the wall of the tank while it is being molded but with a sufficient mobility to be able to compensate for the post-molding shrinkage which, for HDPE tanks, is about 3%.

Hence, preferably, the swirl pot is fastened to the wall of the tank with the aid of 3 snap rivets, one of which is made in a rigid tab and constitutes a "fixed" fastening and the other two of which are made in flexible tabs so as to render the swirl pot mobile with respect to these 2 corresponding fastening points on the wall of the tank. Most particularly preferably, the two flexible tabs allow the movement of the accessory in two perpendicular directions and also the gripping of the swirl pot by the fastening tool while absorbing the geometrical manufacturing tolerances for molding of the swirl pot.

Alternatively, the swirl pot may be fastened to the wall of the tank by snap riveting with the aid of at least one modular part clipped on said swirl pot, said part comprising a ring through which the snap-riveting is carried out, said ring being fixed to a frame by means of springs. Such a snap-riveting also allows to take care of the above mentioned shrinkage, providing some mobility to the swirl pot relative to the fixation point (snap-rivet) on the tank wall.

It should be noted that the variants (1) to (7) described above also give excellent results outside the scope of the present invention, i.e. independently of the use of an intermediate part allowing the fastening of all types of pumps to a standard swirl pot.

The definitions below apply moreover to all the inventions (the main invention and the 7 variants).

The term "fuel tank" is understood to mean a sealed tank (or hollow body bounded by a wall) capable of storing fuel under diverse and varied usage and environmental conditions. An example of this tank is that with which motor vehicles are fitted.

The fuel tank according to the invention is made of a plastic.

The term "plastic" means any material comprising at least one synthetic resin polymer.

Any type of plastic may be suitable. Particularly suitable plastics belong to the category of thermoplastics.

The term "thermoplastic" is understood to mean any thermoplastic polymer, including thermoplastic elastomers, and also blends thereof. The term "polymer" is understood to mean both homopolymers and copolymers (especially binary or ternary copolymers). Examples of such copolymers are, in a non-limiting way: random copolymers, linear block copolymers, other block copolymers and graft copolymers.

Any type of thermoplastic polymer or copolymer, the melting point of which is below the decomposition temperature, is suitable. Synthetic thermoplastics having a melting range spread over at least 10 degrees Celsius are particularly suitable. Examples of such materials include those that exhibit polydispersion in their molecular weight.

In particular, it is possible to use polyolefins, thermoplastic polyesters, polyketones, polyamides and copolymers thereof. A blend of polymers or copolymers may also be used; similarly it is also possible to use a blend of polymeric materials with inorganic, organic and/or natural fillers such as, for example but without being limiting: carbon, salts and other inorganic derivatives, natural or polymeric fibres. It is also possible to use multilayer structures composed of stacked and joined layers comprising at least one of the polymers or copolymers described above.

One polymer that is often used is polyethylene. Excellent results have been obtained with high-density polyethylene (HDPE).

The wall of the tank may be composed of a single thermoplastic layer, or of two layers. One or more other possible additional layers may, advantageously, be composed of layers made of a barrier material to liquids and/or gases. Preferably, the nature and thickness of the barrier layer are chosen so as to minimize the permeability of liquids and gases in contact with the internal surface of the tank. This layer is preferably based on a barrier resin, that is to say on a resin impermeable to the fuel, such as EVOH (partially hydrolysed ethylene/vinyl acetate copolymer) for example. Alternatively, the tank may be subjected to a surface treatment (fluorination or sulfonation) for the purpose of making it impermeable to the fuel.

The tank according to the invention preferably comprises an EVOH-based barrier layer located between the HDPE-based outer layers.

According to the invention, the tank is molded by blow molding or thermoforming of a parison composed of two sheets that result from cutting one and the same extruded tubular parison as described in the aforementioned Application EP 1 110 697, the content of which is, for this purpose, incorporated for reference into the present application.

By comparison with the molding of two separately extruded sheets, the thickness of which is constant, this approach makes it possible to use parisons of varying thickness (that is to say in which the thickness is not constant along their length), obtained using a suitable extruding device (generally an extruder equipped with a die and a punch, the position of which is adjustable). Such a parison takes account of the reduction in thickness that occurs during molding at certain points on the parison, as a result of non-constant rates of deformation of the material in the mold.

No matter what the technique for molding the parison, this does by definition involve the use of a mold that comprises two cavities intended to be in contact with the external surface of the parison, the thermoforming or blow-molding of the parison taking place by the parison being pressed against these cavities by applying a vacuum from behind the cavities or by using a pressurized gas injected inside the parison.

According to the invention, the mold also comprises a core which incorporates at least one part of the tool for fastening the swirl pot. The term "core" is understood to mean a part of suitable shape and size for being able to be inserted between the mold cavities and, in particular, to be introduced into the parison while it is being molded. A part such as this is, for example, described in Patent GB 1 410 215, the content of which is for this purpose incorporated by reference into the present application. Advantageously, this core may be used for fastening several accessories to the parison at the same time, something which the alternative devices, such as for example robot arms, cannot in general accomplish. In this variant, the accessory is fastened to the inner wall of the tank and the concave relief is pointing towards the inside of this tank.

The core may also be used to introduce the pressurized gas needed for blow-molding the parison. Moreover, when the parison to be blown consists of two parts, the core may also be used to keep the edges of these two parts hot, at least during certain steps of the process (in general: the steps preceding the welding-together of the two parts to produce the tank). Two-part parisons are very suitable for this variant as they can be separated upon opening the mold and thus make it easier to fasten the fill tube.

Finally, the core may also be used at least partially for process control. For this purpose, it is possible for example to incorporate a camera into the core so as to display and check the quality of the fastening of the accessory as explained previously. This camera may also check the quality of the fastening (connection) of the fill tube (and of all the other possible components of the tank). Generally, these checks take place by image analysis. One or more sensors for measuring one or more quantities, such as force, stroke, pressure, temperature, may also be installed on the core so as to better monitor the fastening of the accessories.

Figure 2:
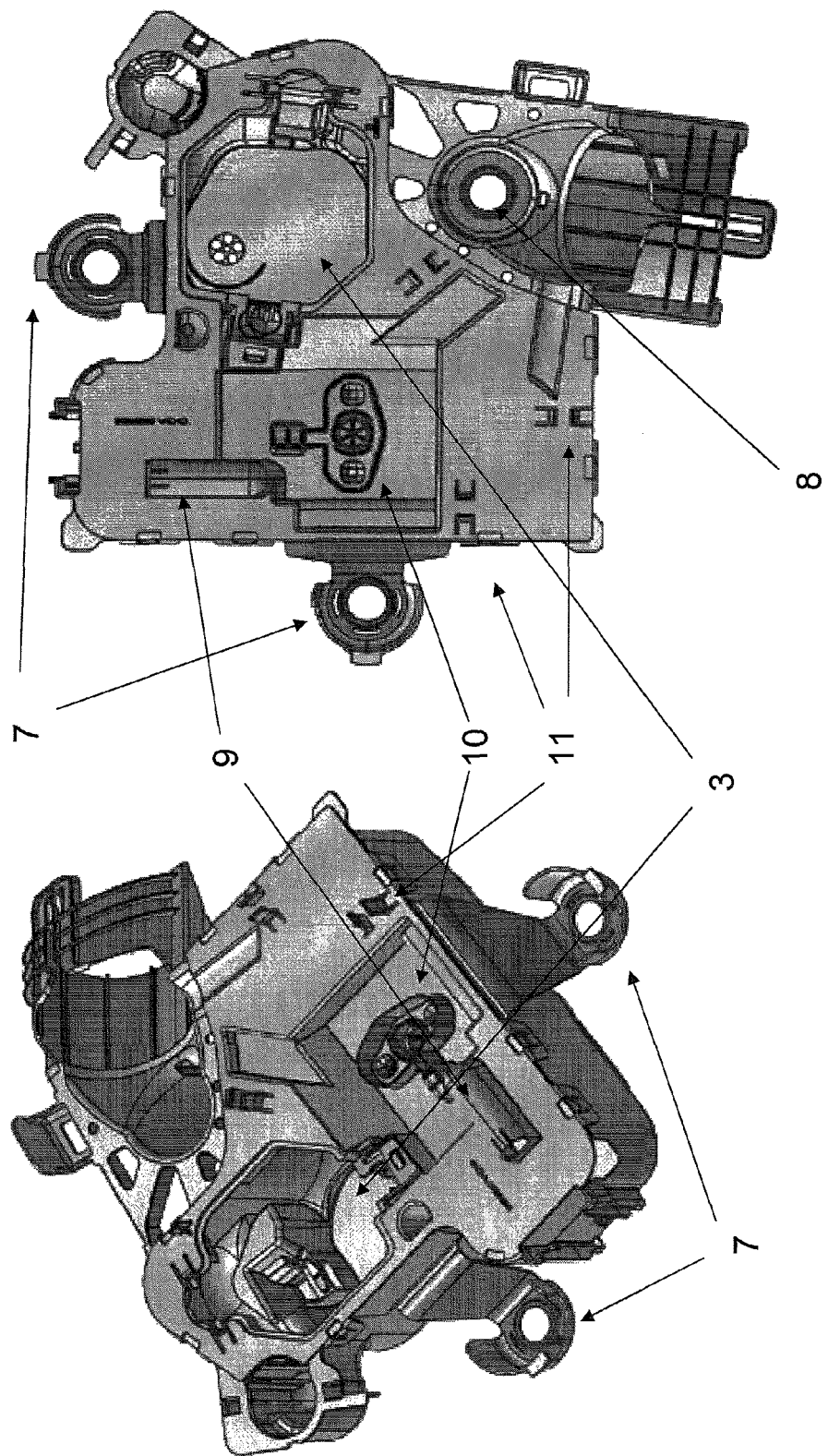
FIG. 2 illustrates a swirl pot with a housing which is intended for the pump and the intermediate part from FIG. 1.
Figure 3:
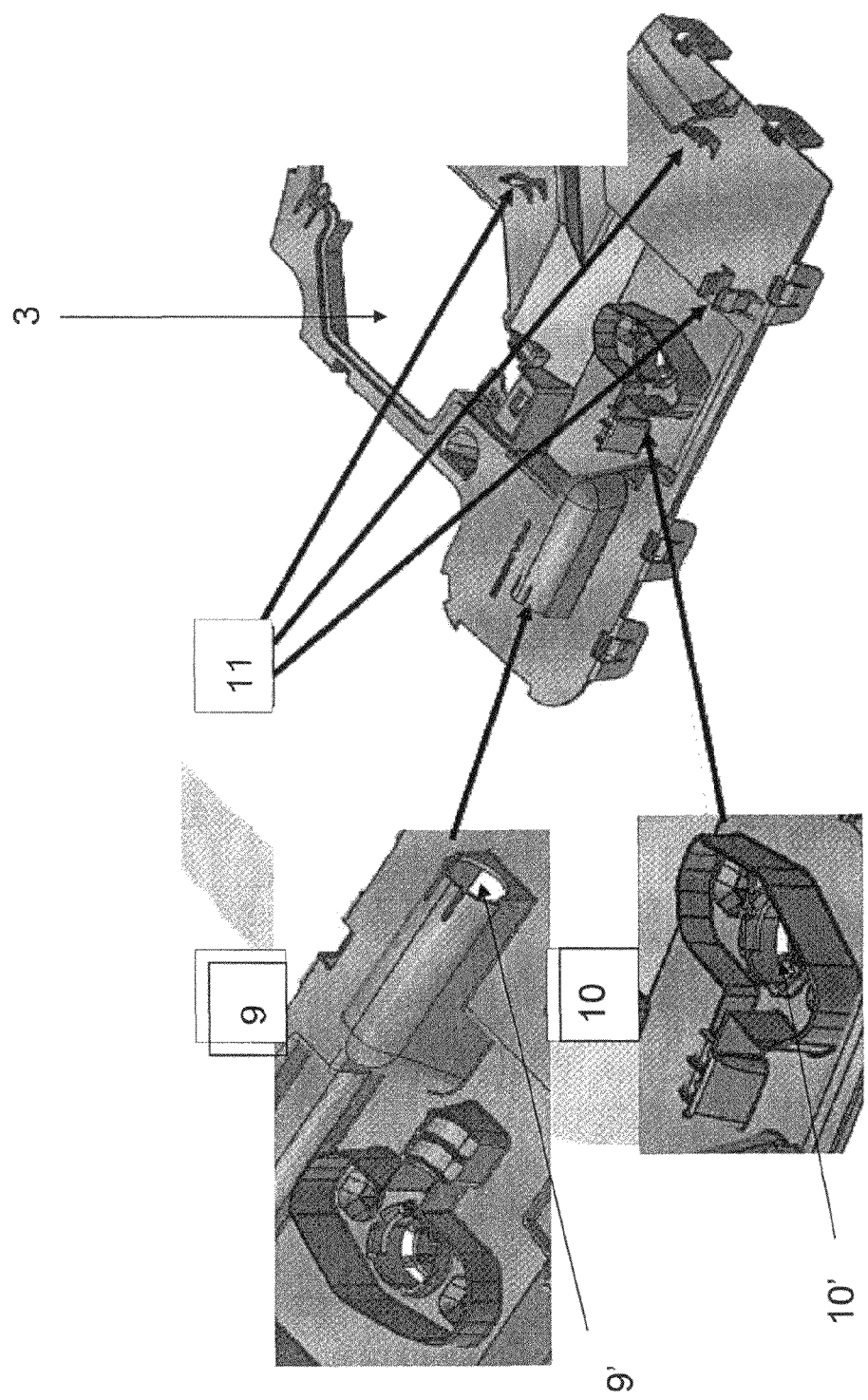
FIG. 3 shows details of certain devices present on the cover of the swirl pot, namely: a relief (9), a relief (10), and clips (11) in three separate views.
Figure 4:
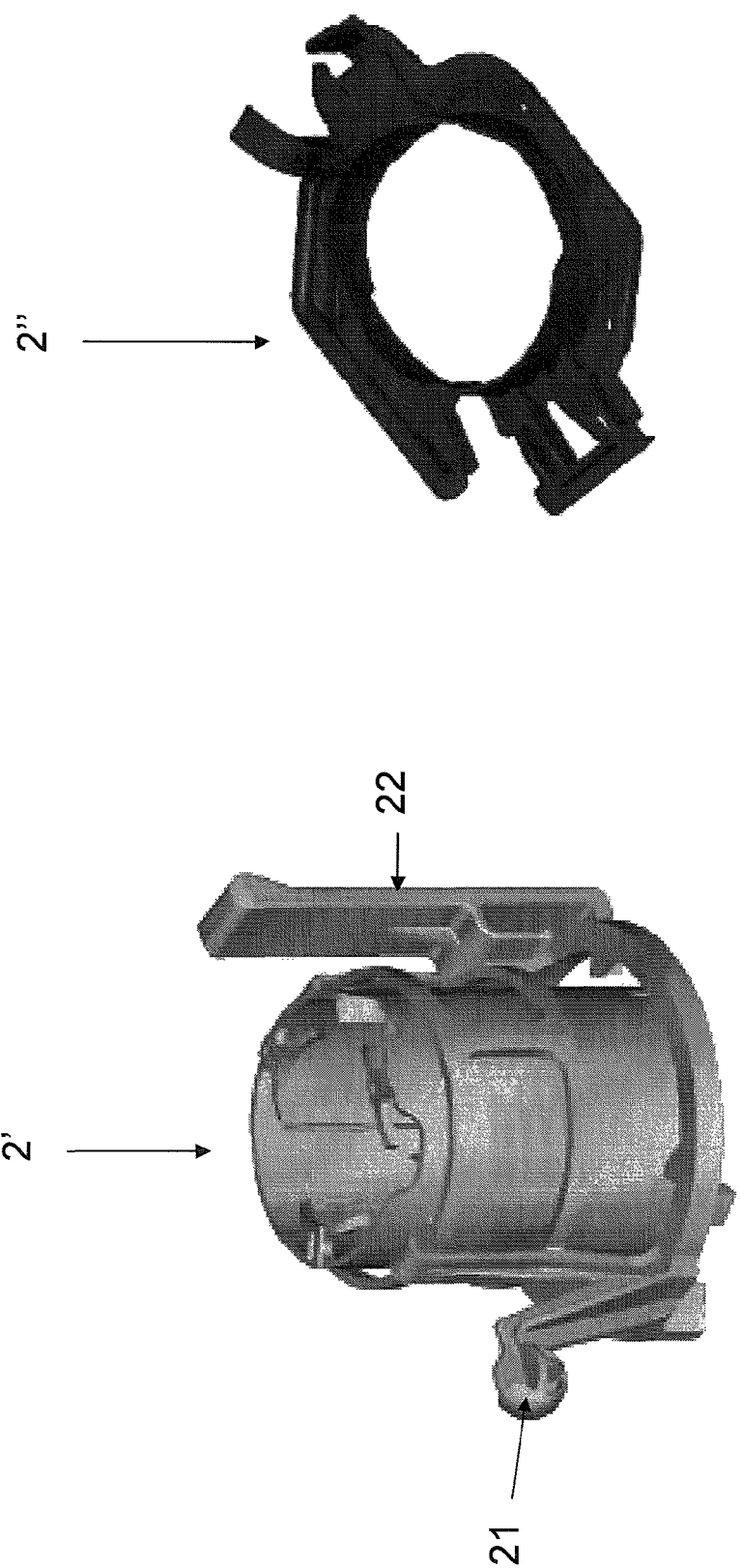
FIG. 4 illustrates the intermediate part in detail in two different views comprising a pump holder (2') and a separate cover (2") to provide leaktightness to the swirl pot.

The present invention is illustrated, in a non-limiting manner, by the appended FIGS. 1 to 4, which illustrate certain variants of the invention. FIG. 1 illustrates a pump (1) located in an intermediate part (2) that is used to mount the latter in a housing (3) of the swirl pot illustrated in FIG. 2 (from two different viewing angles), FIG. 3 illustrating its cover in detail and FIG. 4 illustrating the intermediate part in detail.

The intermediate part (2) illustrated in FIGS. 1 and 4 in fact receives the assembly composed of the pump (1), its filter (4) through which the fuel is sucked up, and a jet pump (5) equipped with an elastomeric part (6) that enables the acoustic emissions to be reduced. This jet pump (5) is intended to suck up fuel in the vicinity of the swirl pot in order to fill it.

FIG. 2 illustrates the swirl pot with the housing (3) which is intended for the pump and the intermediate part from FIG. 1. Also seen therein is the mechanism that makes it possible to fasten this swirl pot to the wall of a fuel tank and that comprises three tabs provided with a snap-riveting orifice, including two flexible tabs (7) and one rigid tab (8). Such a fastening mechanism makes it possible to compensate for the shrinkage of the tank during its post-molding cooling (i.e. to ensure that the swirl pot remains fastened thereto without creating tensions in the wall of the tank) while guaranteeing a fixed position of the swirl pot in the tank owing to the snap rivet of the rigid tab (8).

Finally, FIG. 3 shows details of certain devices present on the cover of the swirl pot, namely:

- a relief (9) into which the end of a transfer line (not represented) leading to the swirl pot may slide in order to compensate for the shrinkage via cooling, which is the order of 3% in the case of an HDPE tank; this relief is provided with slots into which corresponding protuberances on the line may slide (or vice versa: the relief may have protuberances and the line, slots), and the wall of the cover located under this relief comprises an opening (9') that makes it possible to ensure that the fuel exiting this line definitely enters the swirl pot without leaks;
- a relief (10) surrounding the orifice (10') through which the main jet pump (5) conveys fuel from the main pouch into the swirl pot, this relief making it possible to prevent leaks at this location, while allowing a certain relative movement between the jet pump and its suction orifice; and
- clips (11) that make it possible to fasten the liquid feed and return lines to the swirl pot.

As can be seen in FIG. 4, the intermediate part (2) comprises a pump holder (2') and a separate cover (2") in order to be able to provide leaktightness to the swirl pot. The pump holder comprises a spherical linkage (21) of the ball and socket type (aiming at cooperating with a corresponding relief into the housing (3)), and a lever arm (22) with a clip at its extremity (to be clipped on a corresponding relief of the housing or its cover). The separate cover (2") enables to lock the assembly and to ensure leaktightness.

Figure 5:
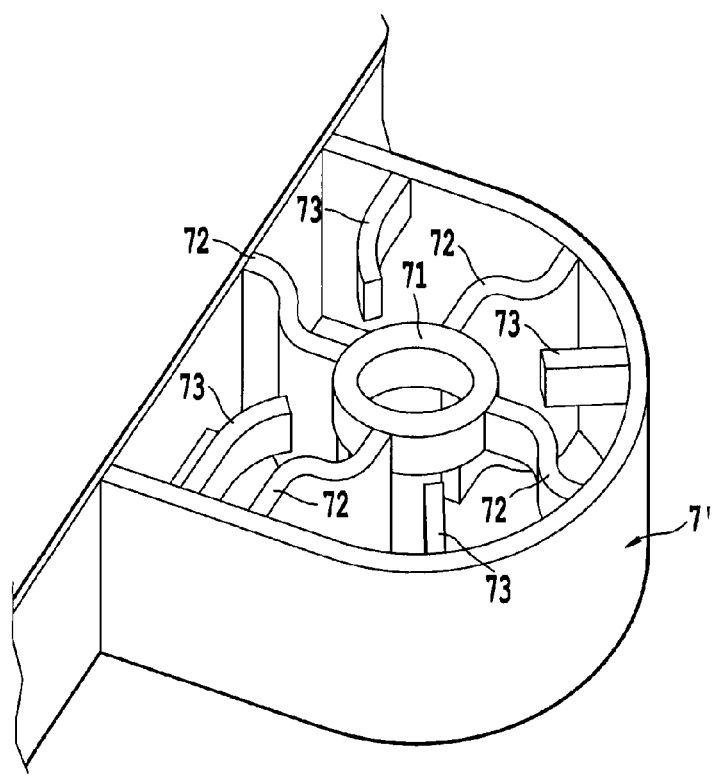
FIG. 5 illustrate an advantageous way of ensuring that the pump can move relative to at least one of is points of attachment to the wall of the tank.

The purpose of FIG. 5 appended to the present application is to illustrate an advantageous way of ensuring that the pump can move relative to at least one of is points of attachment to the wall of the tank. It should moreover be noted that this variant is also advantageous outside the scope of the present invention (i.e. for any accessory that could be fastened to a fuel tank by snap-riveting during the actual manufacture of said tank by molding from a parison).

In fact, the purpose of the flexible tongues (7) illustrated in FIG. 2 is to retain a certain flexibility in order to compensate for the shrinkage during the cooling of the part. However, it is difficult to maintain tight tolerances during the injection molding of plastics, in particular due to the actual geometry of the base and its height. It is necessary therefore to put the base under tension, deform it in order to position it in the core during the blow molding of the tank. When the tank is removed from the mold, the material is still hot and "easily" deformable, and the stresses in the base may deform the tank, or even shear the snap rivet.

To avoid this problem, making these tongues less solid could hence be contemplated, but this is in contradiction with the mechanical strength required during accelerations, impacts, etc.

The variant illustrated in FIG. 5 allows this problem to be solved by making it possible:

1—to be able to use, regardless, the snap-riveting technology without deforming the tank, owing to the use of a ring (71) through which the snap-riveting is carried out;
2—to have smaller tolerances and therefore to pre-stress the base less during its positioning in the tank;
3—to be sufficiently flexible to compensate for the shrinkage owing to "springs" (72); these springs are preferably sufficiently high to make vertical movements negligible;
4—not to break during impacts and accelerations owing to a limited deformation due to the ribs (73) and to the "frame" (7') of greater thickness and/or reinforced;
5—to retain a reduced height and therefore to be easier to apply to various projects with an identical geometry;
6—to be a modular part, that can be fastened by clips.

The invention claimed is:
1. A process for manufacturing a plastic fuel tank equipped with a pump, by molding a tubular parison cut into two sheets via a mold comprising two cavities and a core, said process comprising the following steps:
- step 1. the parison is introduced into the mold cavities;
- step 2. the core is introduced inside the parison, said core having first been fitted with a swirl pot comprising a housing for the pump;
- step 3. the mold is closed so that the cavities come into leaktight contact with the core;
- step 4. the parison is pressed against the cavities by blowing through the core and/or applying a vacuum behind the cavities;
- step 5. using a device firmly attached to the core, the swirl pot is fastened to the parison;
- step 6. the mold is opened to withdraw the core;
- step 7. the final molding of the parison is carried out by blow molding and/or thermoforming; and
- step 8. the tank is demolded, and through an opening in the latter, the pump is mounted in the housing of the swirl pot, wherein the mounting of the pump is achieved by way of an intermediate part, the external shape of which is standard, fixed and complementary to that of the housing, and the internal shape of which is adapted to the pump, wherein said intermediate part is able to be mounted on and demounted from the housing as it is, through a quick connect type connection, without having to alter its overall geometry, wherein the intermediate part comprises a pump holder and a cover, and wherein the pump holder is plugged into the housing using a spherical linkage and a lever arm with a clip.

2. The process according to claim 1, wherein the swirl pot is leaktight and comprises a bowl sealed in a leaktight manner by a cover.

3. The process according to claim 1, wherein the swirl pot has a capacity between 2 and 5 liters.

4. The process according to claim 1, wherein the tank is in the form of a saddle tank comprising a main pouch where the swirl pot is located and at least one secondary pouch, and wherein the swirl pot is fed by two jet pumps: one jet pump sucking up fuel in the main pouch, and the other jet pump being located in the secondary pouch and enabling fuel in this secondary pouch to be transferred to the top of the swirl pot into its cover via a line known as a transfer line which is also fastened to the tank when it is being molded.

5. The process according to claim 4, wherein the swirl pot is provided with a relief into which the end of the transfer line is able to slide.

6. The process according to claim 1, wherein the swirl pot supports a level gauge consisting of a float located at one end of an arm, and wherein said arm pivots in an oblique plane.

7. The process according to claim 1, wherein lines are starting from or leading to the swirl pot, and wherein said lines are fastened to the swirl pot using clips that are molded from a single part with it or with its cover.

8. The process according to claim 1, wherein the swirl pot is fastened to the wall of the tank with the aid of three snap rivets, one of which is made in a rigid tab and constitutes a "fixed" fastening and the other two of which are made in flexible tabs so as to render the swirl pot mobile with respect to these two corresponding fastening points on the wall of the tank.

9. The process according to claim 1, wherein the swirl pot is fastened to the wall of the tank by snap riveting with the aid of at least one modular part clipped on said swirl pot, said part comprising a ring through which the snap-riveting is carried out, said ring being fixed to a frame by means of springs.

10. A process for manufacturing a plastic fuel tank equipped with a pump, by molding a tubular parison cut into two sheets with the aid of a mold comprising two cavities and a core, said process comprising the following steps:
- step 1. the parison is introduced into the mold cavities;
- step 2. the core is introduced inside the parison, said core having first been fitted with a swirl pot comprising a housing for the pump;
- step 3. the mold is closed so that the cavities come into leaktight contact with the core;
- step 4. the parison is pressed against the cavities by blowing through the core and/or applying a vacuum behind the cavities;
- step 5. using a device firmly attached to the core, the swirl pot is fastened to the parison;
- step 6. the mold is opened to withdraw the core;
- step 7. the final molding of the parison is carried out by blow molding and/or thermoforming; and
- step 8. the tank is demolded, and through an opening in the latter, the pump is mounted in the housing of the swirl pot, wherein the tank is in the form of a saddle tank comprising a main pouch where the swirl pot is located and at least one secondary pouch, and wherein the swirl pot is fed by two jet pumps: one jet pump sucking up fuel in the main pouch, and the other jet pump being located in the secondary pouch and enabling fuel in this secondary pouch to be transferred to the top of the swirl pot into its cover via a line known as a transfer line which is also fastened to the tank when it is being molded, the swirl pot being provided with a relief into which the end of the transfer line is able to slide.

11. The process according to claim 10, wherein the mounting of the pump is achieved by way of an intermediate part, the intermediate part comprises a pump holder and a cover, and wherein the pump holder is plugged into the housing using a spherical linkage and a lever arm with a clip.

12. The process according to claim 10, wherein the swirl pot is leaktight and comprises a bowl sealed in a leaktight manner by a cover.

13. The process according to claim 10, wherein the swirl pot has a capacity between 2 and 5 liters.

14. The process according to claim 10, wherein the swirl pot supports a level gauge consisting of a float located at one end of an arm and wherein said arm pivots in an oblique plane.

15. The process according to claim 10, wherein lines are starting from or leading to the swirl pot and wherein said lines are fastened to the swirl pot using clips that are molded from a single part with it or with its cover.

16. The process according to claim 10, wherein the swirl pot is fastened to the wall of the tank with the aid of three snap rivets, one of which is made in a rigid tab and constitutes a "fixed" fastening and the other two of which are made in flexible tabs so as to render the swirl pot mobile with respect to these two corresponding fastening points on the wall of the tank.

17. The process according to claim 10, wherein the swirl pot is fastened to the wall of the tank by snap riveting with the aid of at least one modular part clipped on said swirl pot, said part comprising a ring through which the snap-riveting is carried out, said ring being fixed to a frame by means of springs.

* * * * *